United States Patent
Winter et al.

[11] Patent Number: 6,136,143
[45] Date of Patent: Oct. 24, 2000

[54] SURFACE TREATING ARTICLE INCLUDING A HUB

[75] Inventors: Phillip M. Winter, Birchwood; Charles B. Dousette, Minneapolis; Jerome M. Fried, North Saint Paul; Yvonne I. Lund, Cottage Grove, all of Minn.; David D. Lindeman, Hudson, Wis.

[73] Assignee: 3M Innovative Properties Company, St. Paul, Minn.

[21] Appl. No.: 09/027,866

[22] Filed: Feb. 23, 1998

[51] Int. Cl.[7] ................................................. B32B 35/00
[52] U.S. Cl. .......................... 156/584; 156/344; 7/100; 7/124; 15/3.53; 15/425; 451/59; 451/259
[58] Field of Search ................... 156/344, 584, 156/154; 451/59, 259; 15/3.53, 424, 425, 426; 7/100, 124; 152/323; 301/5.3

[56] References Cited

U.S. PATENT DOCUMENTS

| | | | |
|---|---|---|---|
| D. 333,711 | 3/1993 | Wilson | D32/19 |
| D. 369,447 | 4/1996 | Mann et al. | D32/19 X |
| D. 378,003 | 2/1997 | Eichinger et al. | D32/25 |
| D. 378,004 | 2/1997 | Wilson et al. | D32/25 |
| D. 381,139 | 7/1997 | Johnson et al. | D32/19 X |
| B 576,859 | 2/1976 | Frank et al. | 51/358 |
| 856,323 | 6/1907 | Wickes . | |
| 1,576,924 | 3/1926 | Malloy | 152/379.3 |
| 2,545,453 | 3/1951 | Forss | 121/34 |
| 2,570,009 | 10/1951 | Schmid | 121/34 |

(List continued on next page.)

FOREIGN PATENT DOCUMENTS

| | | |
|---|---|---|
| 0 469 750 | 2/1992 | European Pat. Off. . |
| 0 476 272 | 3/1992 | European Pat. Off. . |
| 1549685 | 8/1979 | Germany . |
| 3030351 | 3/1982 | Germany . |
| 3416186 | 1/1985 | Germany . |
| 297 14 823 U | 10/1997 | Germany . |
| 8-9143 | 9/1998 | Japan . |
| 624928 | 6/1949 | United Kingdom . |
| 1245373 | 9/1971 | United Kingdom . |
| 1370998 | 10/1974 | United Kingdom ................. 152/323 |
| 2 084 059 | 4/1982 | United Kingdom . |
| 2 114 925 | 9/1983 | United Kingdom . |

OTHER PUBLICATIONS

Japanese reference "Tracer B–1" by MKC with translation.
Handbook of Designs and Devices; p. 23, item 206; p. 138, item 1234 and 1236, dated 1946.
Clement Mfg. C.; p. 16, Bruches, middle left of page, dated Jul. 1965.
Brochure entitled "3M Special Introductory Offer New Scotch–Brite™ EXL Deburring and Finishing Wheels for Bench Motors", 61–5000–9073–4–R, © 1991.
Brochure entitled 3M Products for Bench Area Operations, 61–5000–7369, © 1990.
Brochure entitled "3M Heavy Duty Roto Peen", 61–5001–3051–5(461.5)ii, © 3M 1996.
Brochure entitled "Deburr, Clean, Blend or Polish in Small, Confined Areas", 61–5000–8204–7, © 3M 1990.
The Eraser® Astro's Answer to Pinstripping & Adhesive Removal, Astro Pneumatic Tool Company.
Brochure entitled "3M Mandrels 990 Series", 61–5001–1066–5(92.3)R4, 3M Abrasive Systems Division.
Brochure entitled "3M Scotch–Brite Surface Conditioning Unitized Wheels", 61–5001–1039–2 (733.5)ii, 3M Abrasive Systems Division, ©3M 1993.
Brochure entitled "3M Coated Abrasive and Surface Conditioning Products", 61–5001–1636–5.
Copy of International Search Report for International Application No. PCT/US98/13538.

*Primary Examiner*—Mark A. Osele

[57] ABSTRACT

A surface treating article including a hub. The surface treating article and hub provide an improved mechanical interlock to each other. Preferably, the unitary surface treating article is molded to the hub.

52 Claims, 3 Drawing Sheets

U.S. PATENT DOCUMENTS

| | | | |
|---|---|---|---|
| 2,581,567 | 1/1952 | Wiley | 51/197 |
| 2,594,647 | 4/1952 | Hendrickson | 51/135 |
| 2,607,232 | 8/1952 | Van Haase | 74/16 |
| 2,652,321 | 9/1953 | Teague | 51/298 |
| 2,676,160 | 4/1954 | Ochoa | 260/30.6 |
| 2,854,286 | 9/1958 | Salick | 300/21 |
| 2,912,032 | 11/1959 | Alexander | 152/6 |
| 2,950,582 | 8/1960 | Beauchaine | 51/168 |
| 3,204,371 | 9/1965 | Booth | 51/168 |
| 3,395,417 | 8/1968 | Matouka | 15/230 |
| 3,562,968 | 2/1971 | Johnson et al. | 51/389 |
| 3,653,858 | 4/1972 | Field | 51/378 |
| 3,924,362 | 12/1975 | McAleer | 51/358 |
| 3,960,516 | 6/1976 | Biardi | 51/293 |
| 4,055,897 | 11/1977 | Brix | 32/59 |
| 4,088,729 | 5/1978 | Sherman | 264/259 |
| 4,150,955 | 4/1979 | Samuelson | 51/298 |
| 4,525,132 | 6/1985 | Williams | 425/117 |
| 4,554,765 | 11/1985 | Grimes et al. | 51/401 |
| 4,774,788 | 10/1988 | Shacham et al. | 51/168 |
| 4,809,467 | 3/1989 | De Fazio | 51/358 |
| 4,830,807 | 5/1989 | Warren et al. | 264/235 |
| 4,866,319 | 9/1989 | Crutchfield | 310/47 |
| 4,951,423 | 8/1990 | Johnson | 51/168 |
| 5,031,269 | 7/1991 | Lautenschlger | 152/323 X |
| 5,042,207 | 8/1991 | Kirn | 51/168 |
| 5,123,139 | 6/1992 | Leppert et al. | 15/230 |
| 5,190,620 | 3/1993 | Winter | 156/344 |
| 5,233,719 | 8/1993 | Young et al. | |
| 5,259,914 | 11/1993 | Fisher | 156/584 |
| 5,269,874 | 12/1993 | Winter | 156/584 |
| 5,273,558 | 12/1993 | Nelson et al. | 51/298 |
| 5,273,559 | 12/1993 | Hammar et al. | |
| 5,284,039 | 2/1994 | Torgerson | 72/53 |
| 5,332,098 | 7/1994 | Fisher | 206/576 |
| 5,369,916 | 12/1994 | Jefferies et al. | 451/532 |
| 5,624,990 | 4/1997 | Vipperman | 524/425 |
| 5,823,634 | 10/1998 | Pozzobon | 301/5.3 |
| 5,879,504 | 3/1999 | Winter | 156/344 |
| 5,897,170 | 4/1999 | Keleny | 301/5.3 |

SURFACE TREATING ARTICLE INCLUDING A HUB

TECHNICAL FIELD

The present invention relates to a surface treating article including a hub. More specifically, the invention relates to a surface treating article and hub which are securely attached together.

BACKGROUND OF THE INVENTION

Surface coverings such as decorative decals, stripes, graphics, emblems, and protective moldings are used extensively in a variety of applications. These surface coverings are typically adhered with pressure-sensitive adhesives to painted and unpainted surfaces of automobiles, trucks, airplanes, and boats. The pressure sensitive adhesives typically are based on acrylic polymers or elastomers which may have been modified by the addition of tackifiers and stabilizers to enable the surface covering item to adhere to the surface by finger or roller pressure.

In the process of repairing and repainting portions of a painted surface to which the surface coverings are adhered, removal of the coverings may be necessary. Removal of relatively thin surface coverings such as decals and pinstripes is presently done by rotating an eraser unit or soft elastomeric discs at high speeds against the workpiece. This rotation generates adequate heat to cause the adhesive to lose its adhesion and thus release the surface coverings so they can be removed without damaging the painted surface. As it rotates against a workpiece, the eraser unit or soft elastomeric discs will be used up as a result of extensive usage.

One eraser unit for removing such surface coverings is disclosed in Fisher (U.S. Pat. No. 5,259,914). This patent discloses an disc-shaped eraser unit with a flat disc embedded inside the eraser member. The disc has a central opening and two rim notches. When molding the rubber eraser member with the disc embedded, the rubber material will fill the two rim notches. A bolt having an elongated shaft extends through the central opening of the disc and is secured by a nut and washer. The elongated shaft extending out from the eraser member is attaching to a rotating drive means. As the eraser unit rotates against a workpiece, the outer periphery is worn down and renewed.

Because of the minimal mechanical interlock between the embedded disk and eraser material of Fisher, that system relies on a sufficiently high adhesion between the embedded disk and material and sufficiently high strength of the eraser material to prevent the embedded disk from shearing loose and spinning freely within the eraser. Therefore, such a system would not be suitable for applications in which there is a weaker adhesion between the disk or drive means and the eraser material or in which there is a lower strength eraser material.

For convenience, it is also desirable to visually perceive the disc embedded inside the eraser member during use to indicate the life of the eraser material remaining and to avoid damaging the workpiece by rotating the embedded disc accidentally against the workpiece.

Another apparatus used to remove the surface coverings described above is a soft elastomeric discs is disclosed in Winter (U.S. Pat. No. 5,269,874). This patent discloses a rotatable body comprising at least one disc of elastomer and spacers secured to an arbor and drive means.

Co-pending application "Portable Apparatus for Removing Heat Softenable Surface Coverings," U.S. patent application Ser. No. 08/868,915, now U.S. Pat. No. 5,879,504, discloses a filled elastomeric composition that comprises an elastomer, about 2 to 43 wt-% of an organic lubricant selected from the group consisting of solid organic lubricants and polar organic lubricants and about 2 to 43 wt-% of a non-abrasive particulate, wherein the organic lubricant and the non-abrasive particulate together comprise about 4 to 45 wt-% of the filled elastomeric composition that is useful for removing surface coverings described above.

SUMMARY OF THE INVENTION

One aspect of the present invention provides rotary-driven surface treating article. The rotary-driven surface treating article comprises a hub and a unitary surface treating article attached to the hub. The hub includes: i) a body including a first end, a second end opposite the first end, and an outer peripheral surface, wherein the body has a longitudinal axis, and wherein the body is configured to be operatively connected to a drive means; ii) a plurality of protrusions extending radially from the body, wherein the protrusions include a proximate protrusion portion having a first circumferential width and a distal protrusion portion having a second circumferential width, wherein the proximate protrusion portion is between the body and the distal protrusion portion, and wherein the first circumferential width is less than the second width; and iii) a plurality of transverse grooves, wherein each of the grooves is located between adjacent protrusions, wherein the grooves include a distal groove portion having a first circumferential width and a proximate groove portion having a second circumferential width, wherein the proximate groove portion is between the body and the distal groove portion, and wherein the first circumferential width is less than the second width. The unitary surface treating article may be attached to the hub by a plurality of arms extending inwardly into the plurality of transverse grooves.

In one preferred embodiment, the plurality of protrusions are evenly spaced around the body.

In another preferred embodiment, each of the protrusions includes a first side surface extending from the body to the distal protrusion portion, a second side surface opposite the first side surface extending from the body to the distal protrusion portion, a distal surface extending from first side surface to the second side surface and a top surface extending from the body and a bottom surface opposite the top surface and extending from the body, wherein the first surface, second surface and the distal protrusion surface extend from the top surface to the bottom surface. The hub may further include a disk segment extending between adjacent ones of the protrusions, wherein the disk segment is located between the top surface and the bottom surface of the protrusions. The hub may firther include a plurality of the disk segments, wherein each of the transverse grooves includes one of the disk segments. The protrusions and the disk segment may be unitary. The body and the protrusions may be unitary. The body, the protrusions and the disk segment may be unitary. The disk segment may include a hole therethrough. The protrusion may have a first height and the disk segment may have a second height, wherein the second height is no more than one-third of the first height of the protrusion. Each of the disk segments may include a hole therethrough. The top surface and the bottom surface of the protrusions may be visually perceptible.

In another preferred embodiment, the body of the hub may have a hole at the center thereof. The hole may be threaded.

In another preferred embodiment, the surface treating article may be molded to the hub.

Another aspect of the present invention provides a hub for a rotary-driven surface treating article. The hub comprises: a disk, a first plurality of protrusions, and a first plurality of transverse grooves. The disk includes a first major surface, a second major surface opposite the first surface, a peripheral surface extending between the first major surface and the second major surface, and a longitudinal axis, wherein the disk is configured to be operatively connected to a drive means. Each of the first plurality of protrusions includes a first protrusion surface adjacent the first major surface of the disk and a second protrusion surface opposite the first protrusion surface. Each of the transverse grooves is located between adjacent one of the protrusions, wherein the transverse grooves extend to the peripheral surface of the disk.

In one preferred embodiment, the hub may further include a second plurality of protrusions and a second plurality of transverse grooves. Each of the second plurality of protrusions include a first protrusion surface adjacent the second major surface of the disk and a second protrusion surface opposite the first protrusion surface. Each of the second plurality of transverse grooves is located between adjacent ones of the protrusions, wherein the transverse grooves extend to the peripheral surface of the disk. Between the adjacent protrusions, the disk may include a hole therethrough. The disk may include a hole therethrough at each of the transverse grooves.

In another preferred embodiment, each of the first plurality and second plurality of protrusions includes a proximate protrusion portion having a first circumferential width and a distal protrusion portion having a second circumferential width, wherein the proximate protrusion portion is between the longitudinal axis and the distal protrusion portion, and wherein the first circumferential width is less than the second width.

In another preferred embodiment, each of the first plurality and second plurality of the transverse grooves includes a distal groove portion having a first circumferential width and a proximate portion having a second circumferential width, wherein the proximate groove portion is between the longitudinal axis and the distal groove portion, and wherein the first circumferential width is less than the second width.

In another preferred embodiment, the hub may include a first center body located in the general center of the disk, the first center body including a first surface adjacent the first major surface of the disk and a second surface opposite the first surface, wherein the first center body is configured to be operatively connected to a drive means. The hub may further include a second center body located in the general center of the disk, the second center body including a first surface adjacent the second major surface of the disk and a second surface opposite the first surface. The first center body, the second center body, and the disk may be unitary. The first center body may include a hole at the center thereof. The hole may be threaded.

In another embodiment, a unitary surface treating article is engaged with the hub. The surface treating article may be molded to the hub.

In another embodiment, the second surface of the first plurality of the protrusions may be visually perceptible.

A further aspect of the present invention provides a rotary-driven surface treating article comprising a hub and a unitary surface treating article. The hub includes: i) a body including a first end, a second end opposite the first end, and an outer peripheral surface, wherein the body has a longitudinal axis, and wherein the body is configured to be operatively connected to a drive means; ii) a plurality of protrusions extending radially from the body, wherein the protrusions include a proximate protrusion portion having a first circumferential width and a distal protrusion portion having a second circumferential width, wherein the proximate protrusion portion is between the body and the distal protrusion portion, wherein the first circumferential width is less than the second width; iii) a plurality of transverse grooves, wherein each of the grooves is located between adjacent protrusions, wherein the each of the transverse grooves includes a distal groove portion having a first circumferential width and a proximate groove portion having a second circumferential width, wherein the proximate groove portion is between the body and the distal groove portion, wherein the first circumferential width is less than the second width; and wherein each of the plurality of transverse grooves is bounded by the first side surface of one of the protrusions and the second side surface of an adjacent protrusion and wherein the peripheral surface of the body between adjacent protrusions is a concave surface extending between the first side surface and the second side surface; and iv) a disk segment extending between adjacent of the protrusions at each of the transverse grooves, wherein the disk segment includes a hole therethrough at each of the transverse grooves. The unitary surface treating article attached to the hub includes a plurality of arms extending inwardly into the plurality of grooves and including a plurality of fingers extending inwardly into the holes in the disk segments, wherein the surface treating article comprises a elastomeric cylindrical body having a first major surface, a second major surface and an outer peripheral surface between the first major surface and the second major surface wherein the surface treating article is molded to the hub.

BRIEF DESCRIPTION OF THE DRAWINGS

The present invention will be firther explained with reference to the appended Figures, wherein like structure is referred to by like numerals throughout the several views, and wherein.

DETAILED DESCRIPTION OF THE INVENTION

The present invention provides a surface treating article including a hub which has an enhanced mechanical interlock between the hub and surface treating article. The surface treating article and hub are configured to allow the hub to be conveniently visually perceivable during the use of the surface treating article.

Figure 1:
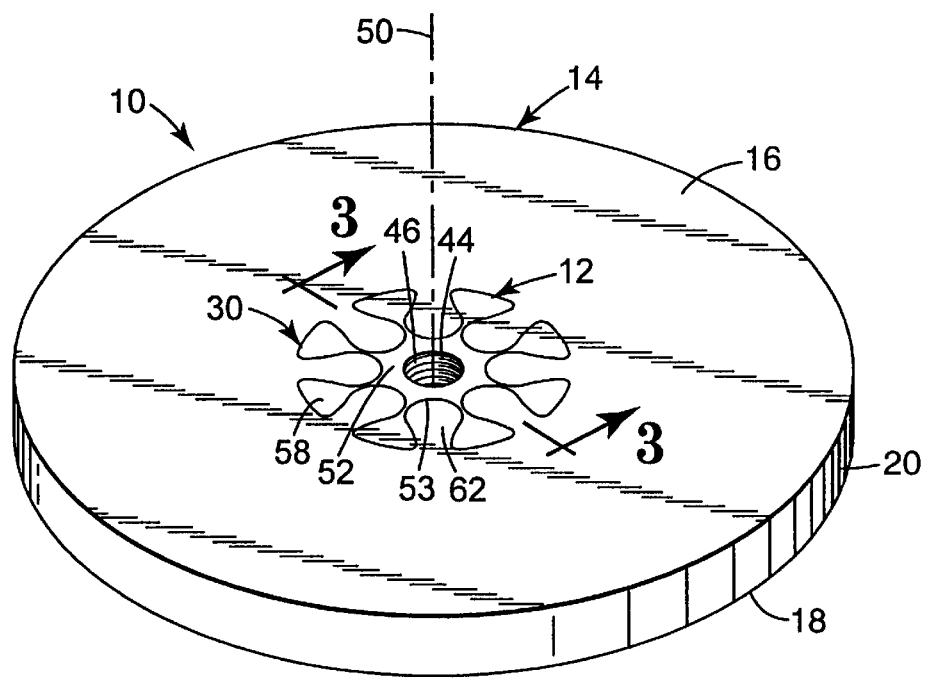
FIG. 1 is an isometric view of a preferred embodiment of a surface treating article of the present invention.

FIG. 1 illustrates one preferred embodiment of the surface treating article 10 of the present invention. Surface treating article 10 includes a hub 12 and a unitary rotatable body 14 attached to hub 12. Rotatable body 14 is attached to hub 12 so as to rotate with hub 12 and to eliminate rotation of body 14 relative to hub 12. Rotatable body 14 has first surface 16 and a second surface 18 opposite the first surface 16. Rotatable body 14 also includes a peripheral surface 20 extending between the first surface 16 and the second surface 18. Rotatable body 14 fer includes a plurality of arms 62 which reach inwardly to engage with the hub 12. The surface treating article 10 is rotatable about axis 50.

Figure 2:
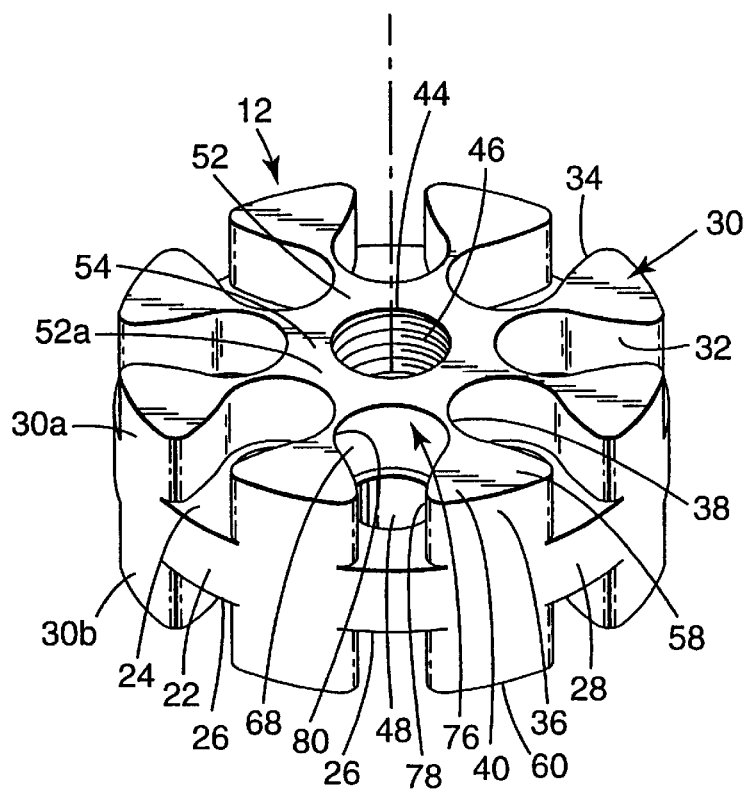
FIG. 2 is an isometric view of a preferred embodiment of a hub of the present invention.
Figure 3:
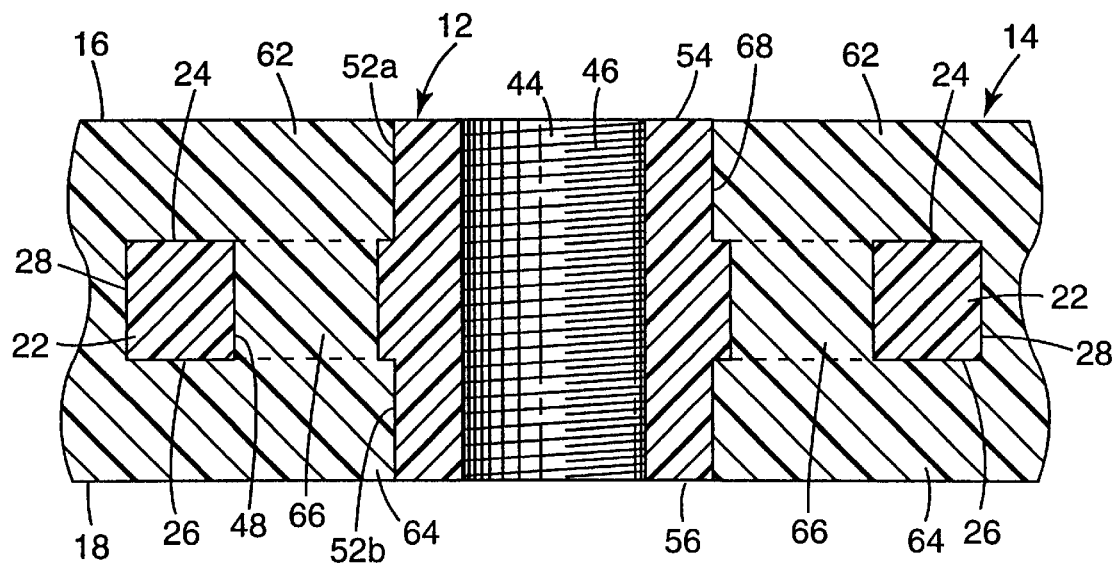
FIG. 3 is a cross-sectional view of the surface treating article taken along line 3—3 of FIG. 1.

Hub 12 is located in the general center of rotatable body 14. Hub 12 has a center body 52 with outer peripheral surface 53. The center body 52 also includes a first end 54 and a second end 56 opposite the first end 54 (as best seen in FIGS. 2 and 3). In the illustrated embodiment, hub 12 has a hole 44 in the general center of body 52. In the illustrated embodiment, hole 44 has threads 46 for mounting the surface treating article 10 on a drive means. Longitudinal axis 50 extends through the center of the hole 44. Hub 12 also includes a plurality of protrusions 30 which extend radially outward from the body 52. In the illustrated embodiment, hub 12 includes eight protrusions 30, although more or less can be used as desired. Preferably, the protrusions are evenly spaced around outer peripheral surface 53 for more even rotation of the article 10. Preferably, first end 54 of hub 12 is flush with the first major surface 16 of the rotatable body 14 and second end 56 is flush with second surface 18 of the rotatable body 14.

FIG. 2 is an isometric view of a preferred embodiment of the hub 12. Each protrusion 30 includes a proximate portion 38 and a distal portion 40. The proximate portion of protrusion 30 is located between the distal portion 40 and body 52. Proximate portion 38 has a first circumferential width. Distal portion 40 has a second circumferential width. In the preferred embodiment, the first circumferential width is less than the second circumferential width.

Each protrusion 30 includes a top surface 58 and a bottom surface 60 opposite the top surface 58. Each protrusion 30 also includes a first side surface 32, a second side surface 34 opposite the first side surface 32, and a distal surface 36. Preferably, top surface 58 and bottom surface 60 of protrusion 30 are perpendicular to longitudinal axis 50. Top surface 58 extends from the first end 54 of body 52 and bottom surface 60 extends from the second end 56 of body 52. First side surface 32 and second side surface 34 are preferably parallel to the longitudinal axis 50 and extend from the outer peripheral surface 53 of the body 52. Distal surface 36 extends between first side surface 32 and second side surface 34 and extends between the top surface 58 and bottom surface 60. Top surface 58 extends between first side surface 32 and extends between second side surface 34 and distal surface 36. Bottom surface 60 extends between first side surface, second side surface and distal surface 36.

A plurality of transverse grooves 76 is located between adjacent protrusions 30. Each transverse groove is bounded by a first side surface 32 of one protrusion 30 and a second side surface 34 of an adjacent protrusion 30. A concave surface 68 on outer peripheral surface 53 of body 52 extends between the first side surface 32 and the second side surface 34. Each transverse groove 76 includes a distal groove portion 78 and a proximate groove portion 80. Proximate groove portion 80 is located between body 52 and the distal groove portion 78. The distal groove portion 78 has first circumferential width and the proximate groove portion 80 has a second circumferential width. In the preferred embodiment, the first circumferential width is less than the second circumferential width.

Optionally, hub 12 may include a disk segment 22 located in each transverse groove 76, extending between adjacent protrusions. Alternatively, disk segments 22 could be located in some transverse grooves 76 and not in others. Each disk segment 22 has a first surface 24 and a second surface 26 opposite the first surface 24. The disk segment 22 includes a peripheral surface 28 extending between the first surface 24 and second surface 26. The disk segment 22 may be positioned anywhere between the top protrusion surface 58 and the bottom protrusion surface 60. In the illustrated embodiment, disk segments 22 are located in the general middle between the top protrusions surface 58 and the bottom protrusion surface 60. In one preferred embodiment, the protrusions 30 and disk segments 22 are unitary. In another preferred embodiment, the disk segments 22 and body 52 are unitary. In a more preferred embodiment, protrusions 30, body 52 and disk segments 22 are unitary. Preferably, protrusions 30 have a first height and the disk segments 22 have a second height that is no more than one-third of the first height of protrusions 30. However, any suitable height relationship may be used. Any or all of the disk segments 22 may include a hole 48 therethrough. Hole 48 may be any desired shape so long as hole 48 extends from first surface 24 to second surface 26 of disk segment 22.

FIG. 3 illustrates a cross-sectional view of the surface treating article 10 taken along line 3—3 of FIG. 1. Rotatable body 14 includes an upper arm 62 and lower arm 64 engaged with each transverse groove 76 of hub 12. Upper arm 62 and lower arm 64 completely fill up the space within the transverse groove 76. The portion of the arms 62, 64 that fill the wide proximate portion 80 of the transverse groove 76 is secured radially by the narrow distal portion 78 of each transverse groove 76. As a consequence, the wider distal portions 40 of adjacent protrusions 30 mechanically interlock the arms 62, 64 into transverse grooves 76. This configuration provides a radial mechanical interlock between rotatable body 14 and hub 12. Upper arm 62 and lower arm 64 are connected to one another by finger 66 of rotatable body 14 that extends through the hole 48 in disk 22. Finger 66 provides a longitudinal mechanical body between upper arm 62 and lower arm 64 making it less likely for arms 62, 64 to move laterally away from hub 12. This configuration between arms 62, 64, finger 66, transverse grooves 76 and protrusions 30 provides a secure mechanical interlock between rotatable body 14 and hub 12. The thickness of disk segment 22 should be chosen to allow the grooves 76 and arms 62,64 have a desired thickness so that the arms 62,64 have adequate strength in the radial direction.

Hub 12 and rotatable body 14 may also experience an adhesive bond to one another that enhances the mechanical interlock described above. This adhesive bond is achieved by using hubs 12 comprising materials which are selected to adhesively bond with materials in the rotatable body 14. Suitable combinations include:

| Materials for Hub 12 | Materials for Rotatable Body 14 |
|---|---|
| Nylon 6,6 | Polyurethane |
| Phenolic Resin | Nylon 11 |
| Steel | Rubber |

Adhesion of the elastomeric composition to the embedded hub 12 is also influenced by the presence or absence of lubricants, hold-release agents and/or other interfacial agents. A preferred elastomeric composition comprises an amount of lithium stearate lubricant. In the event that excess lithium stearate is employed, or a mold realease agent is employed in the molding operation, otherwise good adhesive bonding pairs may be rendered less so.

In an alternative embodiment, disk segments 22 between adjacent protrusions 30 form a unitary disk 22 having a first surface 24 and second surface 26. In this embodiment, a first plurality of protrusions 30a extend from the first surface 24 of disk 22. A second plurality of protrusions 30b may also extend from the second surface 26. Both the first and second plurality of protrusions may have the same geometrical shape as described above. Transverse grooves 76 may have the same shape as described above. The first and second plurality of protrusions 30 may not be aligned longitudinally with one another as illustrated in FIG. 2 and may instead include first plurality of protrusions 30a offset or staggered from second plurality of protrusions 30b. A first center body 52a may be located on first major surface 24 of disk 22. A second center body 52b may preferably be located on the second major surface 26 of disk 22. Preferably, first and second center bodies 52a, 52b are located in the general center of unitary disk 22 and include a hole 44, which has threads 46. Preferably, the first plurality of protrusions 30a are connected to the first center body 52a by proximate protrusion portions 38. Preferably, the second plurality of protrusions 30b are connected to the second center body 52b by proximate protrusion portions 38. However, the protrusions 30a, 30b may not connect to the center bodies 52a, 52b.

Figure 4:
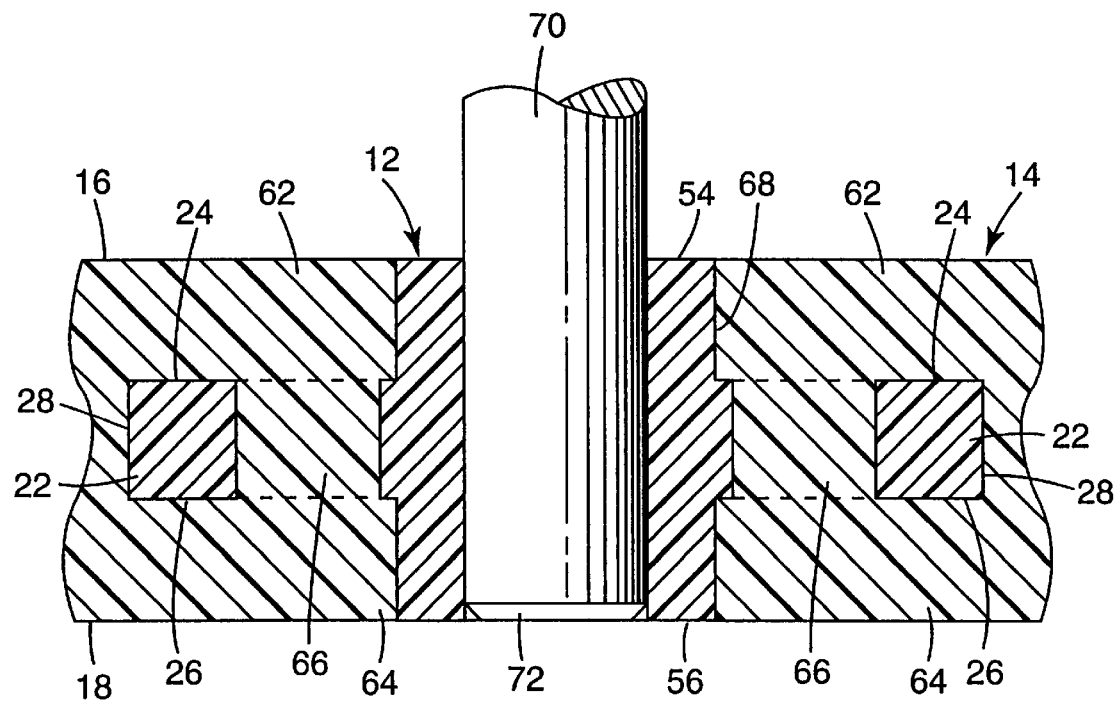
FIG. 4 is a view of an alternate embodiment of the surface treating article of FIG. 3 with a shaft extending from the surface treating article.

FIG. 4 illustrates an alternative means for mounting the surface treating article 10 of FIG. 3 to a drive means. Shaft 70 extends from the center body 52 and has a first end 72. The opposite end of shaft 70 is configured for mounting on a desired power tool. Shaft 70 can be a separate piece as illustrated or may be unitary with the center body 52 of hub 12. Shaft 70 may be a metal insert, a threaded shaft (such as disclosed in U.S. Pat. No. 3,562,968, for example), or any other suitable member for mounting to a drive means.

Figure 5:
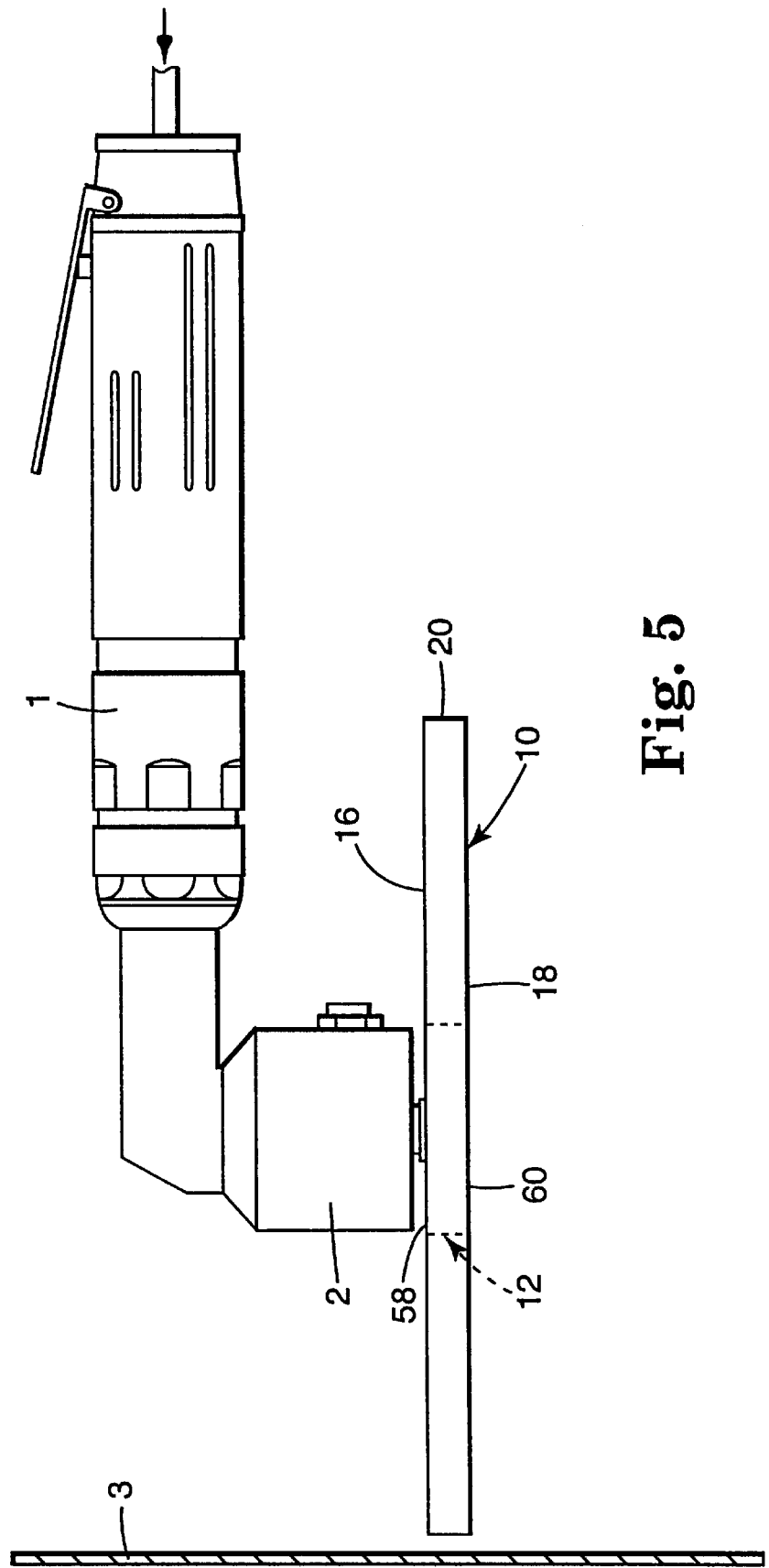
FIG. 5 is a plan view of the surface treating article of FIG. 1 mounted on a drive means operating on a workpiece.

FIG. 5 illustrates the surface treating article 10 of FIG. 1 mounted on a right angle power tool for operating on a workpiece 3. The surface treating article 10 is oriented so that the peripheral surface 20 of rotatable body 14 will contact the surface of the workpiece 3. While removing heat softenable surface coverings, a preferred embodiment of the surface treating article 10 of the invention slowly wears away to regenerate a peripheral surface 20 which is substantially free of surface covering residue being removed. The wearing away or attrition of portions of the peripheral surface act in a way to self clean the surface treating article 10. Top protrusion surfaces 58 are flush with the first major surface 16 of rotatable body 14 and bottom protrusion surfaces 60 are flush with the second major surface 18 of rotatable body 14, making the hub 12 visually perceptible while the surface treating article is used against the workpiece 3. Because hub 12 is visually perceptible, a user can anticipate the life left in the rotatable body 14 and minimize the risk of inadvertently contacting the hub 12 against the workpiece, as may happen with a hub which is not visible. Rotatable body 14 may be used until the peripheral surface wears down to within 0.25 inches (0.6 cm.) of hub 12. It is also possible to use hub 12 in surface treating articles in which the second major surface 18 is the operative surface, or with molded brushes such as disclosed in U.S. Pat. No. 5,679,067.

Suitable power tools for using surface treating article 10 include commercially available ⅜ inch drills.

The hub 12 may comprise thermoplastic polymers, thermosetting polymers, metals, ceramics, or any material that can successfully be machined, molded, stamped, extruded, or otherwise formed to create the physical and mechanical features of the inventive hub. While the hub is typically made of a single material or compound, an alternative embodiment may comprise two or more materials molded, adhered, or otherwise fastened together. For example, a molded thermoplastic hub may contain a metallic insert to provide a threaded cavity for receiving a driving arbor from a power tool. Other such embodiments may comprise an internal portion that is of a lower cost material which is then overlaid with a second material to provide increased adhesion to the surface treating article.

The composition of the hub 12 is preferably a thermoplastic polymer, more preferably a thermoplastic polyamide, and most preferably nylon 6,6. The composition may be filled, toughened, and/or reinforced to improve required physical properties. One preferred hub composition is 33% (by weight) glass-reinforced, rubber-toughened nylon 6,6.

The hub 12 may be made by methods readily known in the mechanical arts. Unitary hub may be made by machining, molding, casting, stamping, forging, or other known means suitable for providing the hub's desired topography. Alternatively, hubs may be produced by assembling previously made substructures by fastening means known in the art. Such previously made substructures may be obtained by machining, molding, stamping, forging, extruding, or other effective means of creating stock shapes that can be assembled with appropriate fastening means into the topography of the inventive hub.

For preferred compositions, the preferred method of manufacture is injection molding. In the event that greater heat stability is required for specific applications, reaction injection molding can be employed with appropriate reactants to render the resulting hub 12 no longer flowable under heat and pressure.

In a preferred embodiment, the rotatable body 14 comprises an elastomer capable of generating frictional heat when driven and subsequently rotated against a surface to be treated. This rotation of rotatable body 14 results in attrition of the outer peripheral surface 20 of rotatable body 14 thereby continuously renewing its frictional interface. The elastomer of the rotatable body 14 may be either thermoplastic or cross-linked (thermosetting). A cross-linked polyurethane elastomer is a preferred elastomer for use in conjunction with the hub 12.

Other suitable elastomeric compositions for rotatable body 14 include: plasticized polyvinyl chloride (PVC), alkylenic block copolymer, styrenic block copolymer, thermoplastic polyester, thermoplastic polyurethane, crosslinked natural rubber, ethylene-propylene elastomer, nitrile rubber, styrene/butadiene rubber, ethylene-propylene terpolymer rubber, thermoplastic polypropylene/ethylene-propylene copolymer blend, neoprene rubber, thermoplastic polyamide, copolymers thereof, and mixtures thereof. More preferably rotatable body 14 is made of a filled elastomeric composition. A detailed discussion of the preferred compositions for such rotatable bodies 14 can be found in assignee's co-pending application "Portable Apparatus for Removing Heat Softenable Surface Coverings," U.S. Pat. No. 5,879,504, the entire disclosure of which is incorporated by reference. This co-pending application teaches an elastomeric composition comprising an elastomer, about 2 to 43 wt-% of an organic lubricant selected from the group consisting of solid organic lubricants and polar organic lubricants and about 2 to 43 wt-% of a non-abrasive particulate, wherein the organic lubricant and the non-abrasive particulate together comprise about 4 to 45 wt-% of the filled elastomeric composition.

The rotatable body 14 may contain hard (>3 Mho) or soft (≦3 Mho) particles, however, hard particles must be employed with great care to avoid scratching the underlying strata of the surface to be treated.

The surface treating article can be made by casting or molding the elastomer compositions directly around the hub 12 of the present invention. A previously made hub 12 is placed centrally into an open mold. The elastomer composition is dispensed into the mold, the mold is then closed, placed into an oven for curing, removed following curing, and de-molded, wherein the surface treating article 10 is ready for use. Preferred dimensions of mold cavities, and thus the finished surface treating articles cast therein include diameters from 5.0 cm to 16.0 cm, and thicknesses of between 0.5 cm and 2.5 cm.

A preferred way of making surface treating articles 10 is molding the elastomeric composition of rotatable body 14 onto hub 12. Molding ensures the rotatable body 14 completely fills the transverse grooves 76 and holes 48 through the disk segments 22. Methods of molding the surface treating articles 10 include insert molding (i.e., injection molding into a closed mold containing a pre-placed hub), reaction injection molding (injection molding with a plurality of reactive components, which also may be insert molded), or mechanically, by pre-manufacturing a sheet of elastomer, cutting from that sheet annuli with i.d. compliant to be inter-engagable with the hub's topographic features, followed by mechanically or adherently fastening said annuli to the hub.

The operation of the present invention will be fuirther described with regard to the following detailed examples. These examples are offered to further illustrate the various specific and preferred embodiments and techniques. It should be understood, however, that many variations and modifications may be made while remaining within the scope of the present invention.

Test Method

Test panels were prepared as follows. 1-inch×12-inch (2.54 cm×30.48 cm) strips of SCOTCH™ 4210 Acrylic Foam Tape, commercially available from Minnesota Mining and Manufacturing Company, St. Paul, Minn. were applied to 18 in.×30 in.×1/32 inc. thick (45.72 cm×76.20 cm×0.79 mm thick) Clear/Color Automotive Black painted panels prepared by ACT Laboratories, Inc. of Hillsdale, Mich. After the application of the tape strips, the panels were heated for 30 minutes at 180° F. (82.2° C.) in a forced convection oven to "age" the specimens.

Removal Test

A "pre-worn" surface treating article of each example was weighed and threaded onto a steel mandrel. The mandrel was then mounted in the chuck of a SNAP-ON Blue Point 11 (Snap-On, Inc., Kenosha, Wis.) air drill that was supplied with 98 psi air via a ¼ inch (0.64 cm) interior diameter hose. When activated, the air drill rotated the test surface treating article at 1900 to 2000 rpm under load. For the removal test, the rotating body of the surface treating article was urged against the tape strips until they were successfully removed from the painted panel. The length of tape cumulatively removed during the life of the surface treating article was recorded and the surface treating article was weighed again to determine the amount of wear. Rotatable body 14 worn down to within 0.1875 inches (0.48 cm.) of the hub 12 indicating that the hub 12 securely held the rotatable body 14 for the useful life of the surface treating article 10.

EXAMPLES 1 AND 2

The hub of the present invention was tested for efficacy as the attachment means for a stripe and molding adhesive removal surface treating article, the composition of which produces a relatively soft, low-strength rotatable body, thus making for an excellent evaluative test for the hub. The composition described in Table 1 was mixed and made ready for transfer to a steel ring mold having an interior diameter of 4.09 inches (10.39 cm) and a depth of 0.75 inch (1.90 cm). The depth of the mold was reduced to ⅝ inch (1.59 cm) by placing a ⅛ inch (0.32 cm) thick polyethylene disc in the ring prior to casting. All mold components were coated with a silicone mold release agent. The ring mold was placed on a 9 inch×9 inch×¼ inch (22.9 cm×22.9 cm×0.64 cm) steel plate, a 1.5 inch diameter by ⅝ inch thick (3.81 cm diameter by 1.59 cm thick) black nylon 6,6 hub of the inventive design (either with or without a coating of mold release), and the mixed composition was poured into the mold. The mold assembly was allowed to stand at room temperature for 18 hours. In order to evaluate end-point failure modes, the surface treating article were dressed to a diameter of 2.5 inches (6.35 cm) by urging the rotating body against a 5-inch (12.7 cm) SURFORM rasp (The Stanley Works, New Britain, Conn.) that was attached to a piece of wood. The thus "pre-worn" surface treating article was finally smoothed by rotating it lightly against an automobile body file.

TABLE 1

| Component | Parts by weight |
| --- | --- |
| Poly bd | 200 |
| Plasticizer | 70 |
| Terethane 2000 | 30 |
| 1,4,butanediol | 6 |
| DABCO 33-LV | 0.5 |
| Zeolite molecular sieve | 4.5 |
| Antioxidant | 1.0 |
| Lithium stearate | 45 |
| Talc | 45 |
| MDI | 51.3 |

| Glossary of Materials | |
| --- | --- |
| Poly bd: | "Poly bd Resin R-45HT", a hydroxy-terminated homopolymer of 1,3-butadiene, commercially available from Atochem North America, Inc., Polymers Division, Philadelphia, Pennsylvania. |
| plasticizer: | "Santicizer 261", a $C_7$–$C_9$ alkyl benzylphthalate plasticizer, commercially available from Monsanto Company, St. Louis, Missouri. |
| Terathane 2000: | Polyether glycol [poly(oxy-1,4-butandiyl)-I-hydro-ω hydroxy], commercially available from duPont Specialty Chemicals, Wilmington, Delaware. |
| 1,4-butanediol: | Commercially available from GAF Chemicals Corporation, Wayne, New Jersey. |
| DABCO 33-LV: | Catalyst comprising 33% triethylenediamine in dipropylene glycol, commercially available from Air Products and Chemicals, Inc., Allentown, Pennsylvania. |
| lithium stearate: | Lubricant lithium stearate "#306", commercially available from Witco Organics Division; Witco Corporation, Chicago, Illinois. |
| talc: | "Mistron Monomix Talc", commercially available from Luzenac America, Inc., Englewood, Colorado |
| MDI: | "Isonate 143L", diphenylmethanediisocyanate, commercially available from Dow Plastics, Midland, Michigan. |
| molecular sieve zeolite: | "Baylith L Paste" - a moisture scavenger which is a potassium sodium silicoaluminate of zeolite A type with a pore size of 3A in a paste form with 50% castor oil, and commercially available from Bayer Corporation and distributed by A. B. Colby, McMurray, Pennsylvania. |

-continued

| | Glossary of Materials |
|---|---|
| antioxidant: | "Irganox 1076", octadecyl 3,5,D-tert butyl 4 hydroxy hydrocinnamate, an antioxidant and thermal stabilizer available from Ciba Additives Division of Ciba-Geigy Corporation, Tarrytown, New York. |
| RAM Mold Release 225: | Mold release composition available from Harcros Chemicals, Inc., Kansas City, Kansas. |

To demonstrate the usefulness of the hub of the present invention in both the presence and absence of adhesive bonding of the rotatable body composition to the hub composition, one hub (Example 1) was sprayed with isopropanol to provide a clean surface and to promote adhesive bonding. (The isopropanol was allowed to evaporate prior to casting.) The other hub (Example 2) was dipped into a mold release agent and residual solvent allowed to evaporate. This treatment of Example 2 would be expected to minimize adhesion to the hub by the rotatable body composition, providing a test of the mechanical interlocking provided by the improved hub design. Both rotatable bodies with and without adhesion to the hub were tested according to the Removal Test. The results are shown in Table 2, and they show that, without respect to adhesive bonding of the rotatable body composition to the hub composition, the improved hub performs well to drive the surface treating article, minimize slippage, and maximize attritive wear as was desired.

TABLE 2

| Example | Hub treatment | Final Wear Mode | Feet (m) of molding adhesive removed | Wheel Wear (g) |
|---|---|---|---|---|
| 1 | Isopropanol | Attrition | 20 ft (6.1 m) | 21.4 |
| 2 | mold release | Attrition | 21 ft (6.4 m) | 25.9 |

The tests and test results described above are intended solely to be illustrative, rather than predictive, and variations in the testing procedure can be expected to yield different results.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. For example, hub 12 can be used with any rotary driven molded articles such as molded abrasive articles or any others. Thus, the scope of the present invention should not be limited to the exact details and structures described herein, but rather by the structures described by the language of the claims, and the equivalents of those structures.

What is claimed is:

1. A rotary-driven surface treating article, comprising:
 a) a hub including:
  i) a body including a first end, a second end opposite said first end, and an outer peripheral surface, wherein said body has a longitudinal axis, and wherein said body is configured to be operatively connected to a drive means;
  ii) a plurality of protrusions extending radially from said body, wherein said protrusions include a proximate protrusion portion having a first circumferential width and a distal protrusion portion having a second circumferential width, wherein said proximate protrusion portion is between said body and said distal protrusion portion, and wherein said first circumferential width of said protrusions is less than said second circumferential width of said protrusions;
  iii) a plurality of transverse grooves, wherein each of said grooves is located between adjacent protrusions, wherein said grooves include a distal groove portion having a first circumferential width and a proximate groove portion having a second circumferential width, wherein said proximate groove portion is between said body and said distal groove portion, and wherein said first circumferential width of said transverse grooves is less than said second circumferential width of said transverse grooves; and
  iv) a disk segment extending between adjacent ones of said protrusions; and
 b) a unitary surface treating article attached to said hub including a plurality of arms extending inwardly into said plurality of transverse grooves.

2. The article of claim 1, wherein said plurality of protrusions are evenly spaced around said body.

3. The article of claim 1, wherein each of said protrusions includes:
 a) a first side surface extending from said body to said distal protrusion portion;
 b) a second side surface opposite said first side surface extending from said body to said distal protrusion portion;
 c) a distal surface extending from first side surface to said second side surface; and
 d) a top surface extending from said body and a bottom surface opposite said top surface and extending from said body, wherein said first surface, second surface and said distal protrusion surface extend from said top surface to said bottom surface.

4. The article of claim 3, wherein each of said plurality of transverse grooves is bounded by said first side surface of one of said protrusions and said second side surface of an adjacent protrusion.

5. The article of claim 1, wherein said body and said protrusions are unitary.

6. The article of claim 1, wherein said protrusions have a first height, wherein said body has a second height, and wherein said first height of said protrusions is substantially the same as said second height of said body.

7. The article of claim 1., further including a shaft extending from said first end of said body, wherein said shaft is configured to be operatively connected to a drive means.

8. The article of claim 1, wherein said body has a hole at the center thereof.

9. The article of claim 8, wherein said hole is threaded.

10. The article of claim 1, wherein said hub comprises polyamide.

11. The article of claim 1, wherein said surface treating article comprises an elastomeric cylindrical body having a first major surface, a second major surface, and an outer peripheral surface between said first major surface and said second major surface.

12. The article of claim 11, wherein said surface treating article is molded to said hub.

13. The article of claim 12, wherein an adhesive bond is formed between said surface treating article and said hub.

14. The article of claim 11, wherein said cylindrical body comprises a filled elastomeric composition.

15. The surface treating article of claim 14, wherein said filled elastomeric composition comprises an elastomer, about 2 to 43 wt-% of an organic lubricant selected from the group consisting of solid organic lubricants and polar organic lubricants and about 2 to 43 wt-% of a non-abrasive particulate, wherein the organic lubricant and the non-abrasive particulate together comprise about 4 to 45 wt-% of the filled elastomeric composition.

16. A rotary-driven surface treating article, comprising:
   a) a hub including:
      i) a body including a first end, a second end opposite said first end, and an outer peripheral surface, wherein said body has a longitudinal axis, and wherein said body is configured to be operatively connected to a drive means,
      ii) a plurality of protrusions extending radially from said body, wherein said protrusions include a proximate protrusion portion having a first circumferential width and a distal protrusion portion having a second circumferential width, wherein said proximate protrusion portion is between said body and said distal protrusion portion, wherein said first circumferential width of said protrusions is less than said second circumferential width of said protrusions, and wherein each of said protrusions includes:
         a) a first side surface extending from said body to said distal protrusion portion,
         b) a second side surface opposite said first side surface extending from said body to said distal protrusion portion;
         c) a distal surface extending from first side surface to said second side surface; and
         d) a top surface extending from said body, and a bottom surface opposite said top surface and extending from said body wherein said first surface, second surface and said distal protrusion surface extend from said top surface to said bottom surface; and
      iii) a plurality of transverse grooves, wherein each of said grooves is located between adjacent protrusions, wherein said grooves include a distal groove portion having a first circumferential width and a proximate groove portion having a second circumferential width. wherein said proximate groove portion is between said body and said distal groove portion, and wherein said first circumferential width of said transverse grooves is less than said second circumferential width of said transverse grooves; and
      iv) a disk segment extending between adjacent ones of said protrusions, wherein said disk segment is located between said top surface and said bottom surface of said protrusions; and
   b) a unitary surface treating article attached to said hub including a plurality of arms extending inwardly into said plurality of transverse grooves.

17. The article of claim 16, further including a plurality of said disk segments, wherein each of said transverse grooves includes one of said disk segments.

18. The article of claim 17, wherein each of said disk segments includes a hole therethrough.

19. The article of claim 16, wherein said protrusions and said disk segment are unitary.

20. The article of claim 16, wherein said body, said protrusions and said disk segment are unitary.

21. The article of claim 16, wherein said disk segment includes a hole therethrough.

22. The article of claim 16, wherein said protrusion has a first height and said disk segment has a second height and wherein said second height is no more than one-third of said first height of said protrusion.

23. A rotary-driven surface treating article. comprising:
   a) a hub including:
      i) a body including a first end, a second end opposite said first end, and an outer peripheral surface wherein said body has a longitudinal axis, and wherein said body is configured to be operatively connected to a drive means;
      ii) a plurality of protrusions extending radially from said body, wherein said protrusions include a proximate protrusion portion having a first circumferential width and a distal protrusion portion having a second circumferential width, wherein said proximate protrusion portion is between said body and said distal protrusion portion. and wherein said first circumferential width of said protrusions is less than said second circumferential width of said protrusions, wherein each of said protrusions includes:
         a) a first side surface extending from said body to said distal protrusion portion:
         b) a second side surface opposite said first side surface extending from said body to said distal protrusion portion;
         c) a distal surface extending from first side surface to said second side surface; and
         d) a top surface extending from said body and a bottom surface opposite said top surface and extending from said body, wherein said first surface, second surface and said distal protrusion surface extend from said top surface to said bottom surface; and
      iii) a plurality of transverse grooves, wherein each of said grooves is located between adjacent protrusions, wherein said grooves include a distal groove portion having a first circumferential width and a proximate groove portion having a second circumferential width. wherein said proximate groove portion is between said body and said distal groove portion, and wherein said first circumferential width of said transverse grooves is less than said second circumferential width of said transverse grooves; and
   b) a unitary surface treating article attached to said hub including a plurality of arms extending inwardly into said plurality of transverse grooves, wherein said top surface and said bottom surface of said protrusions are visually perceptible.

24. The article of claim 25, wherein in use, a portion of said outer peripheral surface of said elastomeric body is attrited to provide a renewed peripheral surface.

25. A hub for a rotary-driven surface treating article, said hub comprising:
   a) a disk including a first major surface, a second major surface opposite said first surface, a peripheral surface extending between said first major surface and said second major surface, and a longitudinal axis, wherein said disk is configured to be operatively connected to a drive means;
   b) a first plurality of protrusions, each including a first protrusion surface adjacent said first major surface of said disk and a second protrusion surface opposite said first protrusion surface, wherein each of said first plurality of protrusions includes a proximate protrusion portion having a first circumferential width and a distal protrusion portion having a second circumferential width. wherein said proximate protrusion portion is between said longitudinal axis and said distal protrusion portion, and wherein said first circumferential width of said protrusions is less than said second circumferential width of said protrusions; and c) a first plurality of transverse grooves, each of said transverse grooves located between adjacent one of said protrusions, wherein said transverse grooves extend to said peripheral surface of said disk.

26. The hub of claim 25, further including:

a) a second plurality of protrusions, each including a first protrusion surface adjacent said second major surface of said disk and a second protrusion surface opposite said first protrusion surface; and b) a second plurality of transverse grooves, each of said grooves located between adjacent ones of said protrusions, and wherein said transverse grooves extend to said peripheral surface of said disk.

27. The hub of claim 26, wherein each of said second plurality of protrusions includes a proximate protrusion portion having a first circumferential width and a distal protrusion portion having a second circumferential width, wherein said proximate protrusion portion is between said longitudinal axis and said distal protrusion portion, and wherein said first circumferential width of said protrusions is less than said second circumferential width of said protrusions.

28. The hub of claim 27, wherein each of said protrusions further includes a distal surface continuous with said peripheral surface of said disk.

29. The hub of claim 26, wherein each of said first plurality and second plurality of said transverse grooves includes a distal groove portion having a first circumferential width and a proximate portion having a second circumferential width, wherein said proximate groove portion is between said longitudinal axis and said distal groove portion, and wherein said first circumferential width of said transverse grooves is less than said second circumferential width of said transverse grooves.

30. The hub of claim 26, wherein said protrusions include:

a) a first side surface extending from said major surface of said disk to said second protrusion surface;

b) a second side surface opposite said first protrusion extending from said major surface of said disk to said second protrusion surface; and c) a distal surface extending from said peripheral surface of said disk to said second protrusion surface.

31. The hub of claim 26, further including a first center body located in the general center of said disk, said first center body including a first surface adjacent said first major surface of said disk and a second surface opposite said first surface, wherein said first center body is configured to be operatively connected to a drive means.

32. The hub of claim 31, further including a second center body located in the general center of said disk, said second center body including a first surface adjacent said second major surface of said disk and a second surface opposite said first surface.

33. The hub of claim 32, wherein said first center body, said second center body, and said disk are unitary.

34. The hub of claim 33, further including a shaft extending from said first center body, wherein said shaft is configured to be operatively connected to a drive means.

35. The hub of claim 33, wherein said first center body includes a hole at the center thereof.

36. The hub of claim 35, wherein said hole is threaded.

37. The hub of claim 32, wherein said first center body is connected to said first plurality of protrusions at said proximate portions of said first protrusions and said second center body is connected to said second plurality of protrusions at said proximate portions of said second protrusions.

38. The hub of claim 37, wherein said first and second center bodies have concave surfaces between adjacent ones of said protrusions, wherein said concave surfaces are continuous between a second side surface of one of said protrusions and a first side surface of an adjacent of said protrusions.

39. The hub of claim 32, wherein said second plurality of protrusions have a first height and said second center body has a second height, and where said first height is substantially the same as the second height.

40. The hub of claim 31, wherein said first plurality of protrusions have a first height and said first center body has a second height, and wherein said first height is substantially the same as said second height.

41. The hub of claim 25, wherein said hub comprises polyamide.

42. The hub of claim 25, wherein a unitary surface treating article is engaged with said hub.

43. The hub of claim 42, wherein said surface treating article comprises an elastomeric cylindrical body having a first major surface, a second major surface and an outer peripheral surface between said first major surface and said second major surface.

44. The surface treating article of claim 43, wherein said cylindrical body comprises a filled elastomeric composition.

45. The surface treating article of claim 44, wherein said filled elastomeric composition comprises an elastomer, about 2 to 43 wt-% of an organic lubricant selected from the group consisting of solid organic lubricants and polar organic lubricants and about 2 to 43 wt-% of a non-abrasive particulate, wherein the organic lubricant and the non-abrasive particulate together comprise about 4 to 45 wt-% of the filled elastomeric composition.

46. The hub of claim 42, wherein said second surface of said first plurality of said protrusions are visually perceptible.

47. The surface treating article of claim 46, wherein in use, a portion of said outer peripheral surface of said elastomeric body is attrited to provide a renewed peripheral surface.

48. A hub for a rotary-driven surface treating article. said hub comprising:

a) a disk including a first major surface, a second major surface opposite said first surface, a peripheral surface extending between said first major surface and said second major surface. and a longitudinal axis, wherein said disk is configured to be operatively connected to a drive means:

b) a first plurality of protrusions. each including a first protrusion surface adjacent said first major surface of said disk and a second protrusion surface opposite said first protrusion surface, wherein between adjacent ones of said protrusions, said disk includes a hole therethrough; and c) a first plurality of transverse grooves. each of said transverse grooves located between adjacent one of said protrusions. wherein said transverse grooves extend to said peripheral surface of said disk.

49. The hub of claim 48, wherein said disk includes a hole therethrough at each of said transverse grooves.

50. A hub for a rotary-driven surface treating article. said hub comprising:

a) a disk including a first major surface. a second major surface opposite said first surface. a peripheral surface extending between said first major surface and said second major surface. and a longitudinal axis. wherein said disk is configured to be operatively connected to a drive means;

b) a first plurality of protrusions. each including a first protrusion surface adjacent said first major surface of said disk and a second protrusion surface opposite said first protrusion surface: and c) a first plurality of transverse grooves. each of said transverse grooves located between adjacent one of said protrusions. wherein said transverse grooves extend to said peripheral surface of said disk, wherein a unitary surface treating article is engaged with said hub, wherein said surface treating article comprises a elastomeric cylindrical body having a first major surface. a second major surface and an outer peripheral surface between said first major surface and said second major surface, and wherein said surface treating article is molded to said hub.

51. The hub of claim 50, wherein an adhesive bond is formed between said surface treating article and said hub.

52. A rotary-driven surface treating article, comprising:

a) a hub including:
  i) a body including a first end, a second end opposite said first end, and an outer peripheral surface, wherein said body has a longitudinal axis, and wherein said body is configured to be operatively connected to a drive means;
  ii) a plurality of protrusions extending radially from said body, wherein said protrusions include a proximate protrusion portion having a first circumferential width and a distal protrusion portion having a second circumferential width, wherein said proximate protrusion portion is between said body and said distal protrusion portion, wherein said first circumferential width of said protrusions is less than said second circumferential width of said protrusions;
  iii) a plurality of transverse grooves, wherein each of said grooves is located between adjacent protrusions, wherein said each of said transverse grooves includes a distal groove portion having a first circumferential width and a proximate groove portion having a second circumferential width, wherein said proximate groove portion is between said body and said distal groove portion, wherein said first circumferential width of said transverse grooves is less than said second circumferential width of said transverse grooves; and wherein each of said plurality of transverse grooves is bounded by the first side surface of one of said protrusions and the second side surface of an adjacent protrusion and wherein said peripheral surface of said body between adjacent protrusions is a concave surface extending between said first side surface and said second side surface; and
  iv) a disk segment extending between adjacent of said protrusions at each of said transverse grooves, wherein said disk segment includes a hole therethrough at each of said transverse grooves; and b) a unitary surface treating article attached to said hub including a plurality of arms extending inwardly into said plurality of grooves and including a plurality of fingers extending inwardly into said holes in said disk segments, wherein said surface treating article comprises an elastomeric cylindrical body having a first major surface, a second major surface and an outer peripheral surface between said first major surface and said second major surface wherein said surface treating article is molded to said hub.

* * * * *

UNITED STATES PATENT AND TRADEMARK OFFICE
CERTIFICATE OF CORRECTION

PATENT NO.    : 6,136,143
DATED         : October 24, 2000
INVENTOR(S)   : Phillip M. Winter, Charles B. Dousette, Jerome M. Fried, Yvonne I. Lund, and David D. Lindeman It is certified that error appears in the above-identified patent and that said Letters Patent is hereby corrected as shown below:

Column 9:
Line 51, "11" should read -- II --;

Column 12:
Line 49, "claim 1." should read -- claim 1, --;

Column 13:
Line 34, "body wherein" should read --body, wherein --;
Line 43. "width. wherein" should read -- width, wherein --;;

Column 14:
Line 6, "surface" should read --surface, --;
Line16, "portion." should read -- portion, --;
Line 21, "portion:" should read -- portion; --;
Line 48, "claim 25" should read -- claim 23 --;
Line 66, "width." should read -- width, --;

Column 15:
Line 27, "flither" should read -- further --;

UNITED STATES PATENT AND TRADEMARK OFFICE
CERTIFICATE OF CORRECTION

PATENT NO. : 6,136,143
DATED : October 24, 2000
INVENTOR(S) : Phillip M. Winter, Charles B. Dousette, Jerome M. Fried, Yvonne I. Lund, and David D. Lindeman It is certified that error appears in the above-identified patent and that said Letters Patent is hereby corrected as shown below:

Column 16:
Line 44, "article." should read -- article,--;
Line 49, "surface. and" should read --surface, and--;
Line 51, "means:" should read --means;--;
Line 52, "protrusions. each" should read --protrusions, each--;
Line 58, "grooves. each" should read --grooves, each --;
Line 60, "protrusions. wherein" should read --protrusions, wherein--;
Line 66, "surface. a" should read --surface, a--;

Column 17:
Line 2, "surface. and"should read --surface, and--;
Line 2, "axis. wherein" should read --axis, wherein--;
Line 5, "protrusions. each" should read --protrusions, each--;
Line 8, "surface: and" should read surface; and --;
Line 9, "grooves. each" should read  --grooves, each--;
Line 11, "protrusions. wherein" should read --protrusions, wherein--;and

UNITED STATES PATENT AND TRADEMARK OFFICE
CERTIFICATE OF CORRECTION

PATENT NO. : 6,136,143
DATED : October 24, 2000
INVENTOR(S) : Phillip M. Winter, Charles B. Dousette, Jerome M. Fried, Yvonne I. Lund, and David D. Lindeman It is certified that error appears in the above-identified patent and that said Letters Patent is hereby corrected as shown below:

Column 17:
Line 17, "surface. a" should read --surface, a--.

Signed and Sealed this

Twelfth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,136,143
DATED : October 24, 2000
INVENTOR(S) : Phillip M. Winter, Charles B. Dousette, Jerome M. Fried, Yvonne I. Lund, and David D. Lindeman It is certified that error appears in the above-identified patent and that said Letters Patent is hereby corrected as shown below:

Column 9:
Line 51, "11" should read -- II --;

Column 12:
Line 49, "claim 1." should read -- claim 1, --;

Column 13:
Line 34, "body wherein" should read --body, wherein --;
Line 43. "width. wherein" should read -- width, wherein --;;

Column 14:
Line 6, "surface" should read --surface, --;
Line16, "portion." should read -- portion, --;
Line 21, "portion:" should read -- portion; --;
Line 48, "claim 25" should read -- claim 23 --;
Line 66, "width." should read -- width, --;

Column 15:
Line 27, "flither" should read -- further --;

UNITED STATES PATENT AND TRADEMARK OFFICE
CERTIFICATE OF CORRECTION

PATENT NO.   : 6,136,143
DATED        : October 24, 2000
INVENTOR(S)  : Phillip M. Winter, Charles B. Dousette, Jerome M. Fried, Yvonne I. Lund, and David D. Lindeman It is certified that error appears in the above-identified patent and that said Letters Patent is hereby corrected as shown below:

Column 16:
Line 44, "article." should read -- article,--;
Line 49, "surface. and" should read --surface, and--;
Line 51, "means:" should read --means;--;
Line 52, "protrusions. each" should read --protrusions, each--;
Line 58, "grooves. each" should read --grooves, each --;
Line 60, "protrusions. wherein" should read --protrusions, wherein--;
Line 66, "surface. a" should read --surface, a--;

Column 17:
Line 2, "surface. and"should read --surface, and--;
Line 2, "axis. wherein" should read --axis, wherein--;
Line 5, "protrusions. each" should read --protrusions, each--;
Line 8, "surface: and" should read surface; and --;
Line 9, "grooves. each" should read  --grooves, each--;
Line 11, "protrusions. wherein" should read --protrusions, wherein--;and

UNITED STATES PATENT AND TRADEMARK OFFICE
CERTIFICATE OF CORRECTION

PATENT NO. : 6,136,143
DATED : October 24, 2000
INVENTOR(S) : Phillip M. Winter, Charles B. Dousette, Jerome M. Fried, Yvonne I. Lund, and David D. Lindeman It is certified that error appears in the above-identified patent and that said Letters Patent is hereby corrected as shown below:

Column 17:
Line 17, "surface. a" should read --surface, a--.

Signed and Sealed this

Twenty-sixth Day of June, 2001

*Attest:*

*Attesting Officer*

NICHOLAS P. GODICI
*Acting Director of the United States Patent and Trademark Office*